United States Patent
Krishna et al.

(10) Patent No.: US 10,108,417 B2
(45) Date of Patent: Oct. 23, 2018

(54) STORING NARROW PRODUCED VALUES FOR INSTRUCTION OPERANDS DIRECTLY IN A REGISTER MAP IN AN OUT-OF-ORDER PROCESSOR

(71) Applicant: QUALCOMM Incorporated, San Diego, CA (US)

(72) Inventors: Anil Krishna, Cary, NC (US); Rodney Wayne Smith, Raleigh, NC (US); Sandeep Suresh Navada, Raleigh, NC (US); Shivam Priyadarshi, Morrisville, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/860,032

(22) Filed: Sep. 21, 2015

(65) Prior Publication Data
US 2017/0046154 A1 Feb. 16, 2017

Related U.S. Application Data

(60) Provisional application No. 62/205,379, filed on Aug. 14, 2015.

(51) Int. Cl.
G06F 9/30 (2018.01)
G06F 9/38 (2018.01)

(52) U.S. Cl.
CPC ........ *G06F 9/3005* (2013.01); *G06F 9/30098* (2013.01); *G06F 9/384* (2013.01); *G06F 9/3838* (2013.01)

(58) Field of Classification Search
None
See application file for complete search history.

(56) References Cited

U.S. PATENT DOCUMENTS 8,429,386 B2 4/2013 Jordan et al.
8,583,901 B2 11/2013 Zhu et al.
(Continued)

OTHER PUBLICATIONS

Lipasti et al.; Physical Register Inlining; 2004; IEEE.*
(Continued)

*Primary Examiner* — Corey S Faherty
(74) *Attorney, Agent, or Firm* — W&T/Qualcomm

(57) ABSTRACT

Storing narrow produced values for instruction operands directly in a register map in an out-of-order processor (OoP) is provided. An OoP is provided that includes an instruction processing system. The instruction processing system includes a number of instruction processing stages configured to pipeline the processing and execution of instructions according to a dataflow execution. The instruction processing system also includes a register map table (RMT) configured to store address pointers mapping logical registers to physical registers in a physical register file (PRF) for storing produced data for use by consumer instructions without overwriting logical registers for later executed, out-of-order instructions. In certain aspects, the instruction processing system is configured to write back (i.e., store) narrow values produced by executed instructions directly into the RMT, as opposed to writing the narrow produced values into the PRF in a write back stage.

30 Claims, 7 Drawing Sheets

(56) References Cited

U.S. PATENT DOCUMENTS

2014/0025927 A1 1/2014 Bradbury et al.
2014/0108771 A1 4/2014 Gschwind et al.
2015/0006851 A1 1/2015 Dixon et al.

OTHER PUBLICATIONS

Shen et al.; Modern Processor Design: Fundamentals of Superscalar Processors; 2003; McGraw Hill.*
Ergin, Oguz et al., "Early Register Deallocation Mechanisms Using Checkpointed Register Files," IEEE Transactions on Computers, vol. 55, No. 9, Sep. 2006, pp. 1153-1166.
International Search Report and Written Opinion for PCT/US2016/042240, dated Oct. 17, 2016, 11 pages.
Lipasti, Mikko H. et al., "Physical Register Inlining," Proceedings of the 31st Annual International Symposium on Computer Architecture, IEEE Computer Society, 2004, 11 pages.
Second Written Opinion for PCT/US2016/042240, dated Jul. 12, 2017, 9 pages.
International Preliminary Report on Patentability for PCT/US2016/042240, dated Oct. 10, 2017, 10 pages.

* cited by examiner

STORING NARROW PRODUCED VALUES FOR INSTRUCTION OPERANDS DIRECTLY IN A REGISTER MAP IN AN OUT-OF-ORDER PROCESSOR

PRIORITY APPLICATION

The present application claims priority under 35 U.S.C. § 119(e) to U.S. Provisional Patent Application Ser. No. 62/205,379 filed on Aug. 14, 2015 and entitled "STORING NARROW PRODUCED VALUES FOR INSTRUCTION OPERANDS DIRECTLY IN A REGISTER MAP IN AN OUT-OF-ORDER PROCESSOR (OOP) FOR REDUCED PHYSICAL REGISTER FILE PORT PRESSURE AND/OR INCREASED PERFORMANCE," which is incorporated herein by reference in its entirety.

BACKGROUND

I. Field of the Disclosure

The technology of the disclosure relates generally to out-of-order processors (OoPs), and more particularly to instruction processing systems in OoPs for processing and pipeline instructions.

II. Background

Many modern processors are out-of-order processors (OoPs). OoPs are processors that are capable of dataflow execution of program instructions (referred to as "instructions"). Using a dataflow execution approach, the execution order of instructions in an OOP may be determined by the availability of input data to be consumed by the instructions ("dataflow order") rather than the program order of the instructions. Thus, the OoP may execute an instruction as soon as all input data to be consumed by the instruction has been produced. While dataflow order processing of instructions may cause the specific order in which instructions are executed to be unpredictable, dataflow order execution in an OoP may realize performance gains. For example, instead of having to "stall" (i.e., intentionally introduce a processing delay) while input data to be consumed is retrieved for an older instruction, the OoP may proceed with executing a more recently fetched instruction that is able to execute immediately. In this manner, processor clock cycles that would otherwise be unused for instruction processing and execution may be productively utilized by the OoP.

An OoP may include both in-order and out-of-order pipeline stages. In-order stages in an OoP conventionally include instruction fetching from an instruction cache or memory into one or more instruction pipelines for speculative prediction (e.g., branch prediction), decoding, and obtaining data for source register operands in instructions. Out-of-order pipeline stages in an OoP conventionally include instruction execution and write back of produced data from executed instructions to be consumed by other pipeline instructions. An OoP also includes a register map table (RMT) and physical register file (PRF) structures. When sourcing data for source register operands of instructions, an instruction processing system may access a RMT to identify the physical register corresponding to the logical register of the source register operand. The RMT is provided to map logical registers to physical registers in a PRF, because there are conventionally more physical registers provided in the PRF than a number of logical registers made available to the instructions according to the architecture of the OoP. Providing a PRF allows the OoP to process instructions out-of-order past slower executed instructions that are delayed, such as waiting for data to be read in from system memory. In this regard, later fetched, but earlier executed instructions having the same register source operands as earlier fetched, but later executed instructions, can be assigned a unique physical register in the PRF so as to not overwrite the physical register of the earlier fetched instruction.

Thus, an important design choice in OoPs is the size of the PRF. If it is desired for the OoP to have a visibility to a large number of future instructions (i.e., an instruction window) in order to extract a larger number of instructions that can be executed independently and out-of-order for increased performance, the PRF should be designed to be larger to accommodate assignment of unique physical registers for source operands. However, larger PRF size increases PRF access time and thus cycle time, which decreases performance. A larger PRF size also adds area and associated cost, and increases power consumption. Also, the wider the instruction stages in the instruction processing systems provided to read source data for instructions from physical registers from the PRF in the same processor clock cycle for increased performance, the greater the number of read ports needed in the PRF. A larger window size without sufficient pipeline width may reduce the possible increase in performance in an OoP. Also, the wider the writeback pipeline stage for increased performance, the more write ports that are needed into the PRF to be able to write back the produced values from executed instructions to the physical registers in the PRF. Larger PRFs may also be required to hold the architectural and speculative register states for supporting multi-threading that further exacerbate issues with providing a larger PRF.

SUMMARY OF THE DISCLOSURE

Aspects disclosed herein include storing narrow produced values for instruction operands directly in a register map in an out-of-order processor (OoP). As a non-limiting example, storing narrow produced values for instruction operands directly in a register map in an OoP can reduce physical register file port pressure and/or increased performance. In this regard, in certain aspects disclosed herein, an OoP is provided that includes an instruction processing system. The instruction processing system includes a number of instruction processing stages configured to pipeline the processing and execution of instructions according to a dataflow execution. The instruction processing system also includes a register map table (RMT) configured to store address pointers mapping logical registers to physical registers in a physical register file (PRF) for storing produced data for use by consuming instructions without overwriting logical registers for later executed, out-of-order instructions. In certain aspects disclosed herein, the instruction processing system is configured to write back (i.e., store) narrow values produced by execution instructions directly into the RMT, as opposed to writing the produced narrow values into the PRF in a write back stage. In this manner, when a narrowed produced value is accessed by the instruction processing system for a later consuming instruction, the narrow produced value can be obtained directly from the RMT instead of accessing an address pointer requiring further access into the PRF in a further processor clock cycle(s). Also, because the instruction processing system is configured to directly write back and access narrow produced values in the RMT, it may also be possible to reduce the read and/or write port pressure (i.e., number of ports) in the PRF to reduce area, and associated cost and power consumption, without reduced performance. This is because depending on the application, a certain number of program instructions will produce or consume narrow values thereby reducing the frequency of full data width accesses to the PRF.

In this regard, in one aspect, an instruction processing system for a processor is provided. The instruction processing system comprises an in-order processing stage. The in-order processing stage is configured to fetch an instruction from an instruction memory. The instruction processing system further comprises an out-of-order processing stage. The out-of-order processing stage comprises an execution circuit configured to execute the instruction, and a writeback circuit. The writeback circuit is configured to determine if a produced value generated for the executed instruction in the execution circuit is a narrow produced value. Responsive to the produced value for the executed instruction being a narrow produced value, the writeback circuit is configured to write back the narrow produced value as information to a mapping entry mapped to a logical register of a destination register operand of the executed instruction, of a register map table (RMT) comprising a plurality of mapping entries each configured to store at least one address pointer pointing to an address of a physical register in a physical register file (PRF).

In another exemplary aspect, an instruction processing system for a processor is provided. The instruction processing system comprises a means for fetching an instruction from an instruction memory, a means for executing the instruction, and a means for determining if a produced value generated for the executed instruction is a narrow produced value. Responsive to the produced value for the executed instruction being a narrow produced value, the instruction processing system further comprises a means for writing back the narrow produced value as information to a mapping entry mapped to a logical register of a destination register operand of the executed instruction, of a register map table (RMT) comprising a plurality of mapping entries each configured to store at least one address pointer pointing to an address of a physical register in a physical register file (PRF).

In another aspect, a method of processing an instruction in a processor is provided. The method comprises fetching an instruction in an in-order processing stage from an instruction memory, and executing the instruction in an out-of-order processing stage. The method further comprises determining if a produced value generated for the executed instruction is a narrow produced value. Responsive to the produced value for the executed instruction being a narrow produced value, the method comprises writing back the narrow produced value from the out-of-order processing stage as information to a mapping entry mapped to a logical register of a destination register operand of the executed instruction, of a register map table (RMT) comprising a plurality of mapping entries each configured to store at least one address pointer pointing to an address of a physical register in a physical register file (PRF).

DETAILED DESCRIPTION

Figure 1:
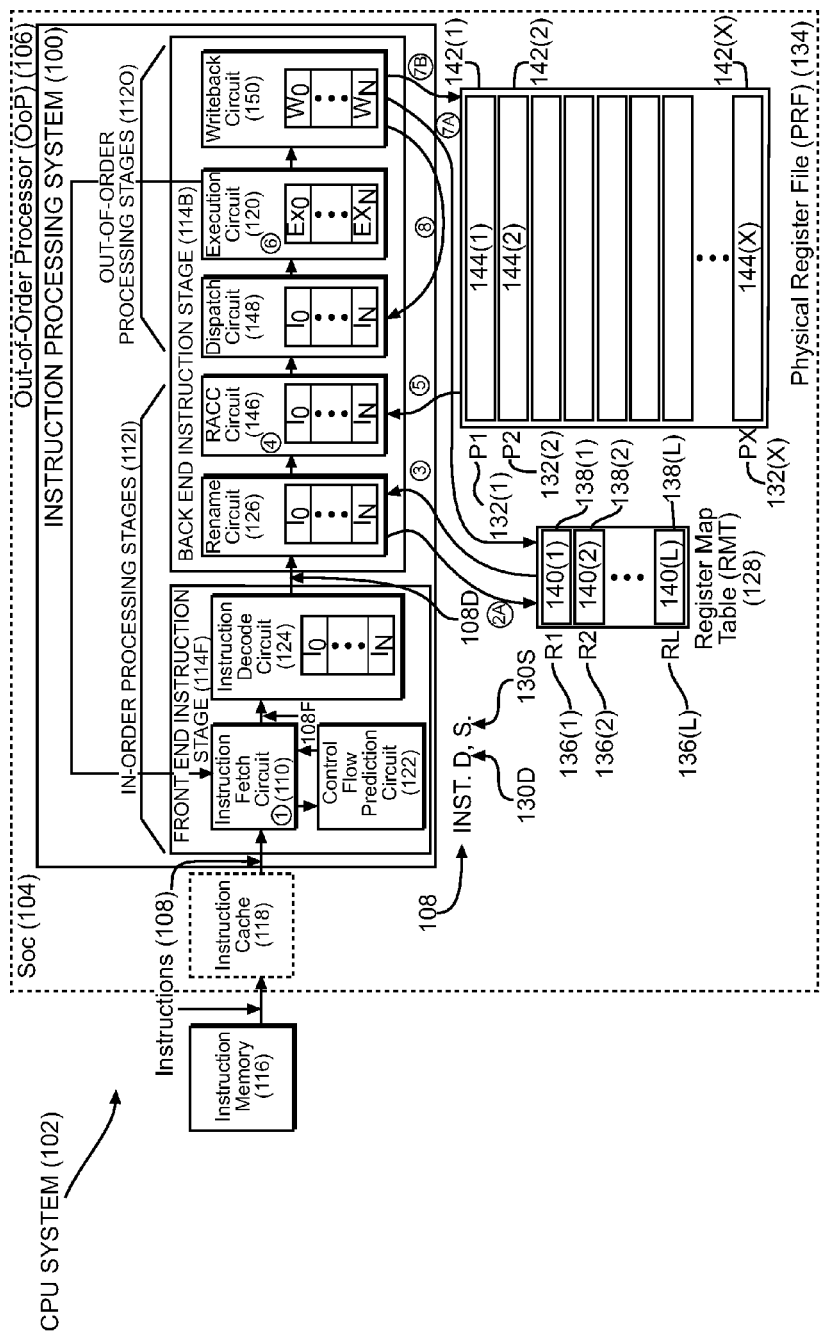
FIG. 1 is a block diagram of an exemplary central processing unit (CPU)-based system that includes an out-of-order processor (OoP) including an instruction processing system configured to fetch, pipeline, and process instructions for execution, and configured to write back narrow values produced by execution instructions directly into a register map table (RMT)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

FIG. 1 is a block diagram of an exemplary instruction processing system 100 provided in a central processing unit (CPU) system 102. The CPU system 102 may be provided in a system-on-a-chip (SoC) 104 as an example. The instruction processing system 100 is configured to process instructions to be executed by an out-of-order processor (OoP) 106 in the CPU system 102. In this regard, instructions 108 are fetched by an instruction fetch circuit 110 provided in an in-order processing stage 112I in a front end instruction stage 114F of the instruction processing system 100 from an instruction memory 116. The instruction memory 116 may be provided in or as part of a system memory in the CPU system 102 as an example. An instruction cache 118 may also be provided in the CPU system 102 to cache the instructions 108 from the instruction memory 116 to reduce latency in the instruction fetch circuit 110 fetching the instructions 108. The instruction fetch circuit 110 is configured to provide the instructions 108 as fetched instructions 108F into one or more instruction pipelines $I_0$-$I_N$ in the instruction processing system 100 to be pre-processed, before the fetched instructions 108F reach an execution circuit 120 in a back end instruction stage 114B in the instruction processing system 100 to be executed. The instruction pipelines $I_0$-$I_N$ are provided across different processing circuits or stages of the instruction processing system 100 to pre-process and process the fetched instructions 108F in a series of steps that are performed concurrently to increase throughput prior to execution of the fetched instructions 108F in the execution circuit 120.

With continuing reference to FIG. 1, a control flow prediction circuit 122 (e.g., a branch prediction circuit) is also provided in the front end instruction stage 114F to speculate or predict a target address for a control flow fetched instruction 108F, such as a conditional branch instruction. The prediction of the target address by the control flow prediction circuit 122 is used by the instruction fetch circuit 110 to determine the next fetched instructions 108F to fetch based on the predicted target address. The front end instruction stage 114F of the instruction processing system 100 in this example also includes an instruction decode circuit 124. The instruction decode circuit 124 is configured to decode the fetched instructions 108F fetched by the instruction fetch circuit 110 into decoded instructions 108D to determine the type of instructions 108 and actions required, which in turn is used to determine in which instruction pipeline $I_0$-$I_N$ the fetched instructions 108F should be placed.

With continuing reference to FIG. 1, in this example, the decoded instructions 108D are then placed in one or more of the instruction pipelines $I_0$-$I_N$ and are next provided to a rename circuit 126 in the back end instruction stage 114B of the instruction processing system 100. The rename circuit 126 is configured to determine if any register names in the decoded instructions 108D need to be renamed to break any register dependencies that would prevent parallel or out-of-order processing of the instructions 108. The instruction processing system 100 in FIG. 1 is capable of processing the fetched instructions 108F out-of-order, if possible, to achieve greater throughput performance and parallelism. However, the number of logical (i.e., architectural) registers provided in the CPU system 102 may be limited.

In this regard, the rename circuit 126 is provided in the back end instruction stage 114B of the instruction processing system 100. The rename circuit 126 is configured to call upon a register map table (RMT) 128 to rename a logical source register operand 130S and/or write a destination register operand 130D of an instruction 108 to available physical registers 132(1)-132(X) (P1, P2, . . . , PX) in a physical register file (PRF) 134. The register map table (RMT) 128 contains a plurality of mapping entries 136(1)-136(L) each mapped to (i.e., associated with) a respective logical register R1-RL. The mapping entries 136(1)-136(L) each contain a data entry 138(1)-138(L) configured to store information 140(1)-140(L) in the form of an address pointer to point to a physical register 132(1)-132(X) in the physical register file (PRF) 134. Each physical register 132(1)-132(X) in the physical register file (PRF) 134 contains a data entry 142(1)-142(X) configured to store data 144(1)-144(X) for the source and/or destination register operand 130S, 130D of an instruction 108.

It may be desired to provide for the OoP 106 in FIG. 1 to have visibility to a large number of future instructions 108 (i.e., an instruction window) in order to extract a larger number of instructions 108 that can be executed independently, out-of-order for increased performance. In this regard, the physical register file (PRF) 134 can be designed to be larger to accommodate assignment of unique physical registers 132(1)-132(X) for source register operands 130S. However, a larger physical register file (PRF) 134 size increases access times to the physical register file (PRF) 134 and thus processor cycle times, which would decrease performance of the OoP 106. Providing a larger physical register file (PRF) 134 also adds area and associated cost to the OoP 106, and increases power consumption. The performance of the OoP 106 becomes worse if the number of supported logical registers 136(1)-136(L) grows. In addition, if the OoP 106 needs to support multiple program contexts, such as via multi-threading, the number of physical registers 132(1)-132(X) required in the physical register file (PRF) 134 may grow substantially.

Figure 2:
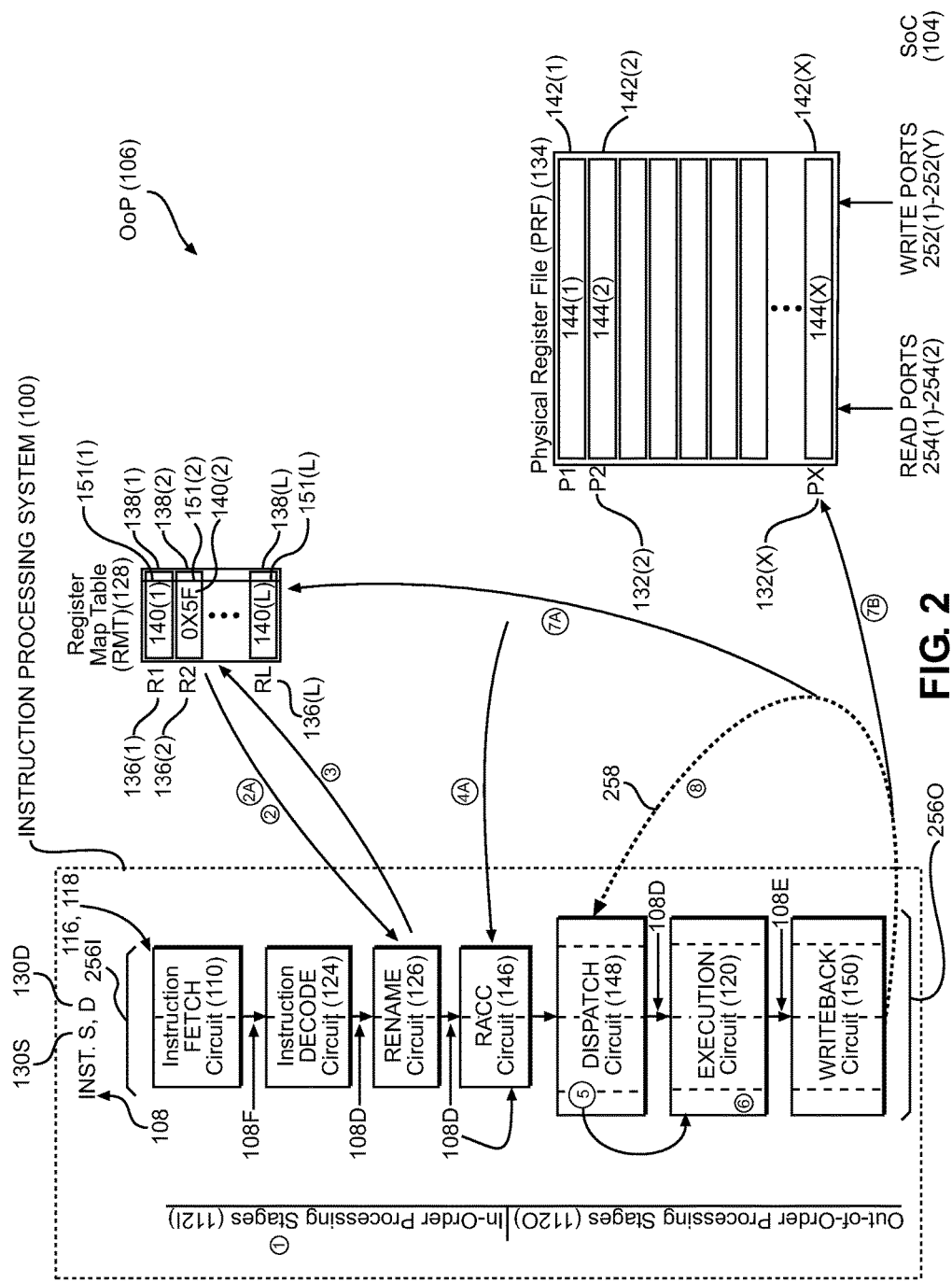
FIG. 2 is a block diagram of the exemplary instruction processing system of the OoP in FIG. 1 to describe more exemplary details for writing back narrow values produced by execution instructions directly into the RMT, and for accessing narrow values for consuming instruction source register operands directly from the RMT.

In this regard, as shown in FIG. 1 and in a more detailed diagram in FIG. 2 of the instruction processing system 100 in FIG. 1, the instruction processing system 100 includes a register access (RACC) circuit 146. The RACC circuit 146 is provided in the in-order processing stage 112I in the instruction pipeline $I_0$-$I_N$ prior to a dispatch circuit 148. As shown in FIG. 2, the RACC circuit 146 is configured to access a physical register 132(1)-132(X) in the physical register file (PRF) 134 based on a mapping entry 136(1)-136(L) mapped to a logical register of a source register operand 130S of a decoded instruction 108D to retrieve a produced value from an executed instruction 108E in the execution circuit 120. The RACC circuit 146 is also configured to provide the retrieved produced value from the executed instruction 108E as the source register operand 130S of an instruction 108 to be executed. Also in the instruction processing system 100 in FIG. 1, as will be discussed below in more detail, the dispatch circuit 148 is provided in the instruction pipeline $I_0$-$I_N$ after the RACC circuit 146 as an out-order processing stage 112O. The dispatch circuit 148 is configured to dispatch the decoded instruction 108D to the execution circuit 120 to be executed when all source register operands 130S for the decoded instruction 108D are available. The execution circuit 120 and a writeback circuit 150 are provided as the out-of-order processing stages 112O.

With continuing reference to the instruction processing system 100 in FIG. 2, as discussed in more detail below, the writeback circuit 150 is configured to write back narrow produced values produced from executed instructions 108E directly into the register map table (RMT) 128. A narrow produced value is a value that has a bit width that is the same or less than the bit width of mapping entries in a register map table (RMT) configured to store address pointers to a physical register file (PRF). In this manner, the narrow produced value can be stored into the register map table (RMT) as opposed to the register map table (RMT) containing an address pointer to a location in a physical register file (PRF) that stores the value. In this example of the instruction processing system 100, a narrow produced value is a value that has a bit width that is the same or less than the bit width of the mapping entries 136(1)-136(L) (R1-RL) in the register map table (RMT) 128. In this regard, the writeback circuit 150 in the instruction processing system 100 in FIG. 2 is configured to determine if a produced value generated for an executed instruction 108E by the execution circuit 120 is a narrow produced value. Responsive to the produced value for the executed instruction 108E being a narrow produced value, the writeback circuit 150 writes back the narrow produced value as information 140(1)-140(L) to a mapping entry 136(1)-136(L) mapped to a logical register of a destination register operand 130D of the executed instruction 108E in the register map table (RMT) 128 rather than storing an address pointer as the information 140(1)-140(L) pointing to an address of a physical register 132(1)-132(X) in the physical register file (PRF) 134. For example, if a narrow produced value resulting from an executed instruction 108E is 0x5F, where the bit width of the mapping entries 136(1)-136(L) in the register map table (RMT) 128 is eight (8) bits, the writeback circuit 150 is configured to write 0x5F directly to a mapping entry 136

(e.g., mapping entry 136(2)) in the register map table (RMT) 128 rather than writing 0x5F to a physical register 132(1)-132(X) in the physical register file (PRF) 134. Thus, additional processing time is not required by the RACC circuit 146 in the instruction processing system 100 to read in the narrow produced value for a source register operand 130S for the decoded instruction 108D to be executed using the information 140(1)-140(L) as an address pointer from the physical register file (PRF) 134. The rename circuit 126 in the instruction processing system 100 can directly read in the source register operand 130S for a narrow produced value from a previous executed instruction 108E from the register map table (RMT) 128 to provide such narrow produced value to the RACC circuit 146.

For example, if a data bit width of the data entries 138(1)-138(L) in the register map table (RMT) 128 in the instruction processing system 100 in FIG. 2 is eight (8) bits wide, the information 140(1)-140(L) can be eight (8) bits wide. Thus, up to two hundred fifty-six (256) physical registers 132(1)-132(X) in the physical register file (PRF) 134 can be addressed by the information 140(1)-140(L) as address pointers using the register map table (RMT) 128 stored by the rename circuit 126 in the instruction processing system 100. Thus, if the produced value from an executed instruction 108E executed by the execution circuit 120 in the instruction processing system 100 is eight (8) bits wide or less, this produced value can be directly written back by the writeback circuit 150 in a data entry 138(1)-138(L) in the register map table (RMT) 128. This is opposed to writing back the narrow produced value into the physical register file (PRF) 134. In this manner, additional processing time is not required by the RACC circuit 146 in the instruction processing system 100 to read in the narrow produced value for a source register operand 130S for the decoded instruction 108D to be executed using information 140(1)-140(L) as an address pointer from the physical register file (PRF) 134. However, if the produced value from an executed instruction 108E by the execution circuit 120 in the instruction processing system 100 in FIG. 2 is a wide produced value (meaning that the data bit width of the produced value is greater than the data bit width of the data entries 138(1)-138(L) (i.e., information 140(1)-140(L) width) in the register map table (RMT) 128, the RACC circuit 146 can read in the wide produced value using information 140(1)-140(L) as an address pointer from the physical register file (PRF) 134, as normal. The writeback circuit 150 is configured to write back wide produced values from the executed instructions 108E to the physical register file (PRF) 134 in this example, because the data entries 138(1)-138(L) in the register map table (RMT) 128 in this example are not wide enough to directly store wide produced values. In this regard, the register map table (RMT) 128 may have a flag, such as a bit 151(1)-151(L) that indicates if the information 140(1)-140(L) stored in a respective mapping entry 136(1)-136(L) is an address pointer or a narrow produced value.

As shown in FIG. 2, the writeback circuit 150 in the instruction processing system 100 is configured to write back narrow produced values from executed instructions 108E directly to the register map table (RMT) 128 can also allow for a reduction in write ports 252(1)-252(Y) provided into the physical register file (PRF) 134 without a reduction in performance. In this manner, the increase in area and/or power consumption that would normally result from providing a larger physical register file (PRF) 134 in the OoP 106 to increase the instruction 108 window may be offset by reducing the number of write ports 252(1)-252(Y) in the physical register file (PRF) 134.

For example, assume that the in-order processing stages 112I of the OoP 106 in FIG. 2 has 'F' in-order instruction processing lanes 256I designed to process 'F' instructions 108 per OoP 106 cycle. For example, 'F' may be up to two (2) instructions 108 in this example. Thus, in this example, two (2) ports would be needed in the register map table (RMT) 128 for each instance of reading and writing data regarding the instructions 108 in the front end instruction stage 114F. Now assume that the out-of-order processing stages 112O of the OoP 106 have 'B' out-of-order instruction processing lanes 256O designed to allow the dispatch circuit 148 to dispatch and the execution circuit 120 to execute 'B' instructions 108 per OoP 106 cycle, with the writeback circuit 150 capable to write back 'B' produced data values per OoP 106 cycle. For example, 'B' may be up to four (4) instructions 108. Thus, in this example, four (4) write ports would be needed in the physical register file (PRF) 134 for each instance of writing data regarding the instructions 108 from the writeback circuit 150 in this example. However, by the writeback circuit 150 being configured to write back narrow produced values directly to the register map table (RMT) 128, it is statistically less often the case that all 'B' values produced by the writeback circuit 150 are also wide produced values that have to be written to the physical register file (PRF) 134. In this manner, the write ports 252(1)-252(Y) provided into the physical register file (PRF) 134 may be reduced to fewer write ports (e.g., 'B'/2 write ports 252(1)-252(Y), where 'Y'='B'/2) than would allow 'B' productions to be written back to the physical register file (PRF) 134 in the same OoP 106 cycle, because of the reduced frequency of the entire width 'B' in the writeback circuit 150 consisting of wide produced values. However, if the entire data bit width 'B' in the writeback circuit 150 consisted of wide produced values to be written to a reduced write port physical register file (PRF) 134, the writeback circuit 150 could be configured to write back the wide produced values to the physical register file (PRF) 134 over more than one OoP 106 cycle. Also, the design size of the physical register file (PRF) 134 may also be able to be reduced without decreasing performance, because storing narrow produced values in the register map table (RMT) 128 may require fewer physical registers 132(0)-132(X) to sufficiently store produced values.

Also, as discussed above, by the RACC circuit 146 not having to access the physical register file (PRF) 134 for retrieving narrow produced values for source register operands 130S of decoded instructions 108D to be executed, fewer read ports 254(1)-254(Z) may also be provided in the physical register file (PRF) 134 without reduced performance and/or to offset the increase in area and/or power consumption of a larger physical register file (PRF) 134. However, by the rename circuit 126 now being configured to read narrow produced values from the register map table (RMT) 128, the number of read ports into the register map table (RMT) 128 may need to increase. An example to mitigate the increase in read ports in the register map table (RMT) 128 is discussed in more detail below with regard to FIG. 5.

Figure 3A:
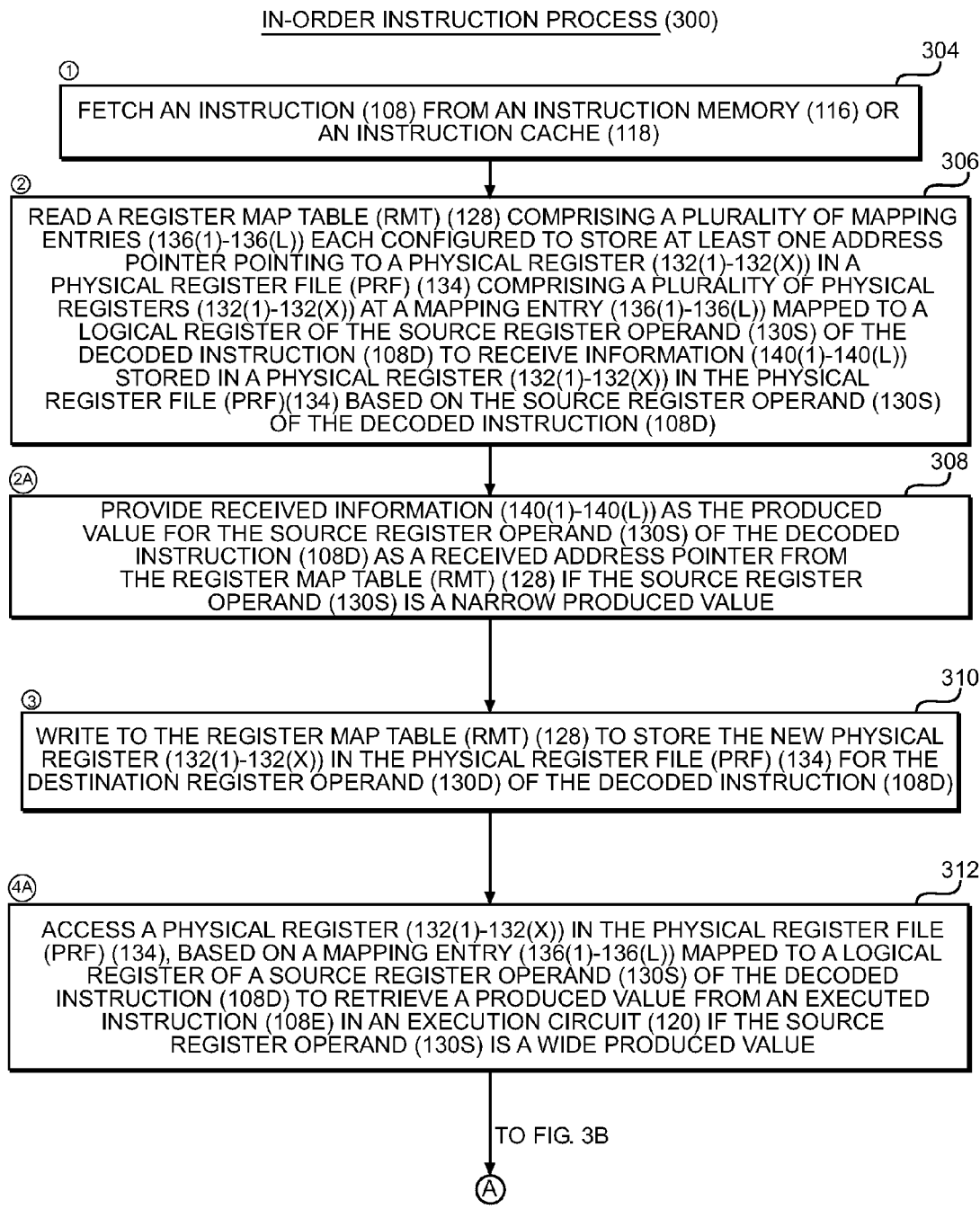
FIGS. 3A and 3B are flowcharts illustrating exemplary in-order instruction processing and out-of-order instruction processing of the instruction processing system in the OoP in FIG. 2 for accessing narrow values for consuming instruction source register operands directly from the register map table (RMT), and writing back narrow produced values generated by executed instructions directly into the register map table (RMT)
Figure 3B:
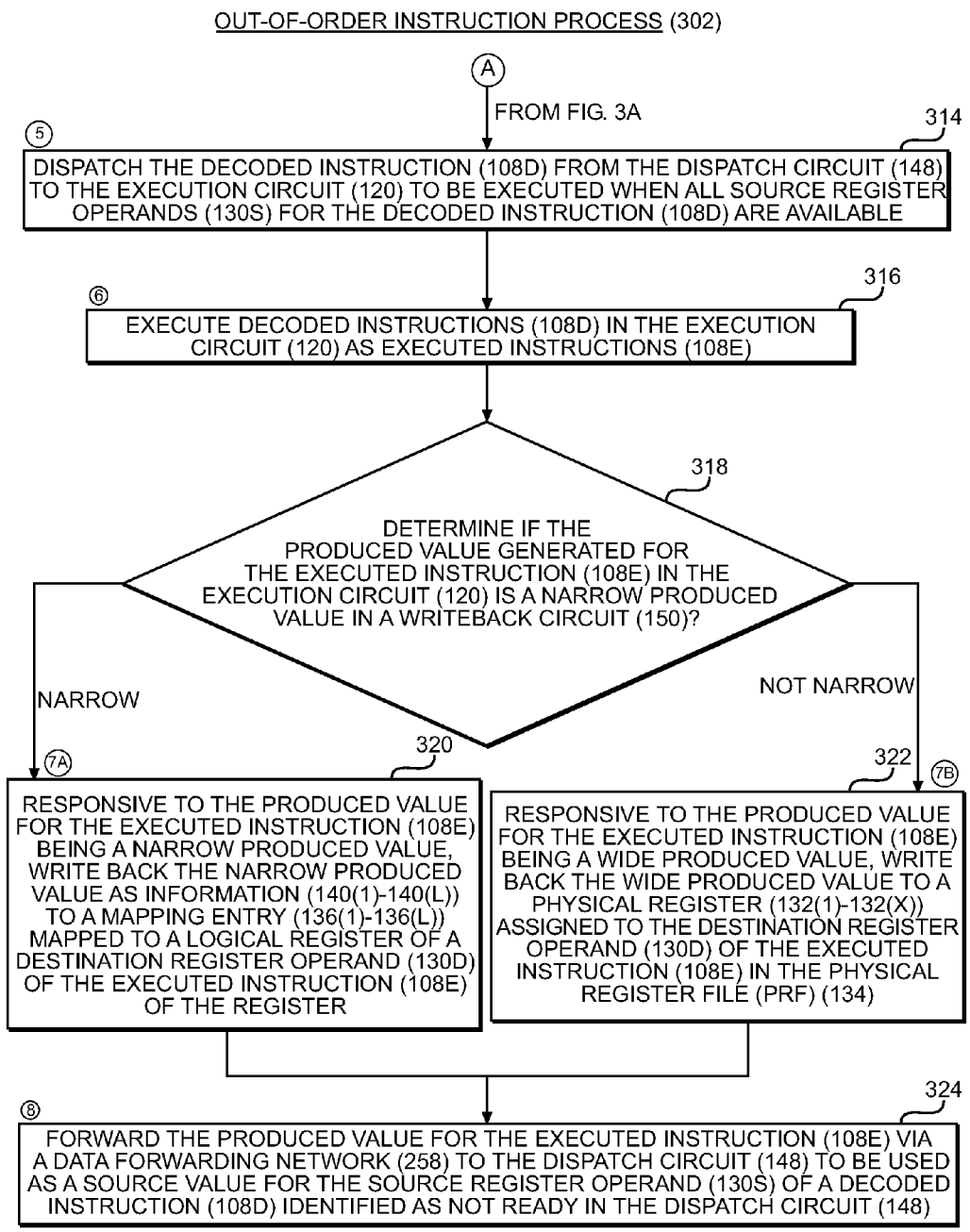

To further illustrate the operation of the instruction processing system 100 in the OoP 106 in FIGS. 1 and 2, FIGS. 3A and 3B are provided. FIGS. 3A and 3B are flowcharts illustrating an exemplary in-order instruction process 300 and an out-of-order instruction process 302 of the instruction processing system 100 in FIGS. 1 and 2. The in-order instruction process 300 in FIG. 3A supports the instruction processing system 100 accessing narrow produced values for consuming instruction source register operands directly from the register map table (RMT) 128 without the need to further access the physical register file (PRF) 134 for such narrow produced values. The out-of-order instruction process 302 in FIG. 3B supports the instruction processing system 100 writing back narrow produced values generated by executed instructions 108E directly into the register map table (RMT) 128, so that the narrow produced values can be accessed directly from the register map table (RMT) 128 as part of the in-order instruction process 300. The in-order instruction process 300 and out-of-order instruction process 302 in FIGS. 3A and 3B will now be discussed with reference to the instruction processing system 100 in FIG. 2.

In this regard, with reference to FIG. 3A, the in-order instruction process 300 starts by the instruction fetch circuit 110 fetching an instruction 108 (block 304 in FIG. 3A; number 1 in FIGS. 1 and 2). The fetched instruction 108F is decoded by the instruction decode circuit 124 to provide the decoded instruction 108D. Next, the rename circuit 126 reads the register map table (RMT) 128 at a mapping entry 136(1)-136(L) mapped to a logical register of the source register operand 130S of the decoded instruction 108D to receive information 140(1)-140(L) based on the source register operand 130S of the decoded instruction 108D (block 306 in FIG. 3A; number 2 in FIGS. 1 and 2). The rename circuit 126 is configured to determine if the received information 140(1)-140(L) from the register map table (RMT) 128 is a narrow produced value or an address pointer mapped to a physical register 132(1)-132(X) storing a physical register file (PRF) 134. For example, as discussed above and in more detail below, the register map table (RMT) 128 may have a flag 151(1)-151(L), such as a bit, per mapping entry 136(1)-136(L) to indicate if the stored information 140(1)-140(L) is an address pointer or a narrow produced value. If the received information 140(1)-140(L) from the register map table (RMT) 128 is determined to actually be a narrow produced value, the rename circuit 126 is then further configured to provide the respective received information 140(1)-140(L) as the narrow produced value as the produced value for the source register operand 130S to be passed to the RACC circuit 146 to be used for execution of the decoded instruction 108D (block 308 in FIG. 3A; number 2A in FIGS. 1 and 2).

With continuing reference to FIG. 3A, the RACC circuit 146 is configured to write to the register map table (RMT) 128 to store the new physical register 132(1)-132(X) in the physical register file (PRF) 134 for the destination register operand 130D of the decoded instruction 108(D) (block 310 in FIG. 3A, number 3 in FIGS. 1 and 2). The RACC circuit 146 is also configured to access a physical register 132(1)-132(X) in the physical register file (PRF) 134 mapped to the mapping entry 136(1)-136(L) in the register map table (RMT) 128 for the source register operand 130S of the decoded instruction 108D for retrieving a wide produced value (block 312 in FIG. 3A; number 4A in FIGS. 1 and 2). The RACC circuit 146 may also include the means in FIG. 2 for accessing a physical register 132(1)-132(X) in the physical register file (PRF) 134 based on a mapping entry 136(1)-136(L) mapped to a logical register of a source register operand 130S of the decoded instruction 108D to retrieve a value produced from an executed instruction 108E in an execution circuit 120. The wide produced value will have been previously generated by the execution circuit 120 as a result of an executed instruction 108E, and written back by the writeback circuit 150 to the physical register file (PRF) 134 mapped. Note that as discussed above, if the produced value for the source register operand 130S of the decoded instruction 108D to be executed was determined to be a narrow produced value stored in the register map table (RMT) 128 by the rename circuit 126, the RACC circuit 146 will not need to access the physical register file (PRF) 134, thereby reducing processing time and power consumption. The decoded instruction 108D with its source register operand 130S value retrieved is provided by the RACC circuit 146 to the dispatch circuit 148 in the out-of-order processing stage 112O. Alternatively, a means may be provided for providing the received produced value as the source register operand 130S for the decoded instruction 108D.

For out-of-order processing in the instruction processing system 100 in FIGS. 1 and 2, the exemplary out-of-order instruction process 302 in FIG. 3B may be employed. In this regard, the dispatch circuit 148 dispatches decoded instructions 108D to the execution circuit 120 to be executed when the source register operand 130S for a decoded instruction 108D is available (block 314 in FIG. 3B; number 5 in FIGS. 1 and 2). Alternatively, a means may be provided for dispatching decoded instructions 108D to the execution circuit 120 to be executed when the source register operand 130S for a decoded instruction 108D is available.

Note that in the instruction processing system 100, the dispatch circuit 148 is provided after the RACC circuit 146 as the out-of-order processing stage 112O. In this manner, the reading of registers for decoded instructions 108D is performed in the in-order processing stage 112I to avoid the complexity in maintaining counters to track the number of active consumers yet to consume a produced value from the physical register file (PRF) 134. Otherwise providing a dispatch circuit 148 as an in-order processing stage 112I may require a large increase in write ports in a physical register file (PRF) 134, because entries in the physical register file (PRF) 134 may be modified from the end of the execution lanes in the execution circuit 120 in addition to the rename circuit 126. Additional read ports would also be needed in a register map table (RMT) 128 to make sure logical to physical mapping is still live in the register map table (RMT) 128 at the writeback stage before updating the mapping with a narrow produced value.

Also, providing the dispatch circuit 148 as the out-of-order processing stage 112O may allow the execution circuit 120 to be more fully utilized on average to execute more instructions 108 per cycle to provide increased performance. This is because the dispatch circuit 148, by being provided as an out-of-order processing stage 112O, can better utilize the larger number of out-of-order instruction processing lanes in the execution circuit 120 for increased parallelism. Decoded instructions 108D can be held in the dispatch circuit 148 until its source register operand 130S is available to provide more decoded instructions 108D in parallel for out-of-order processing by the execution circuit 120. Next, the decoded instructions 108D dispatched to the execution circuit 120 are executed as executed instructions 108E (block 316 in FIG. 3B; number 6 in FIGS. 1 and 2).

With continuing reference to FIG. 3B, the writeback circuit 150 determines if the produced value generated by the execution circuit 120 for an executed instruction 108E is a narrow produced value (block 318 in FIG. 3B). Alternatively, a means may be provided for determining if the produced value generated by the execution circuit 120 for an executed instruction 108E is a narrow produced value. If the produced value generated by the execution circuit 120 is a narrow produced value, as discussed above, the writeback circuit 150 is configured to write the narrow produced value as information 140(1)-140(L) from the register map table (RMT) 128 to the mapping entry 136(1)-136(L) mapped to a logical register of the destination source operand 130D for the executed instruction 108E in the register map table (RMT) 128 (block 320 in FIG. 3B; number 7A in FIGS. 1 and 2). Alternatively, a means, responsive to the produced value for the executed instruction 108E being a narrow produced value, may be provided to write back the narrow produced value directly to the mapping entry 136(1)-136(L) in the register map table (RMT) 128 assigned a logical register mapped to the destination source operand 130D for the executed instruction 108E. As one example, the writeback circuit 150 may be configured to determine if the produced value by the execution circuit 120 is a narrow produced value by determining the number of significant bits in the produced value. Alternate compression mechanisms may also be considered to define narrow produced values as another non-limiting example. If the produced value generated by the execution circuit 120 is a wide produced value, the writeback circuit 150 is configured to write the wide produced value in the physical register file (PRF) 134 to a physical register 132(1)-132(X) assigned to the destination source operand 130D of the executed instruction 108E (block 322 in FIG. 3B; number 7B in FIGS. 1 and 2).

With reference to FIG. 2, because the dispatch circuit 148 is provided as the out-of-order processing stage 112O that waits until the source register operand 130S is available for a decoded instruction 108D before being dispatched, the instruction processing system 100 also includes a data forwarding network 258. The data forwarding network 258 allows the writeback circuit 150 to forward a narrow produced value to the dispatch circuit 148 to be used as a source value for a decoded instruction 108D that is identified as not ready in the dispatch circuit 148 (block 324 in FIG. 3B, number 8 in FIGS. 1 and 2). This allows consuming decoded instructions 108D already in the rename circuit 126 and beyond to get produced values, including narrow produced values, not ready when the register map table (RMT) 128 was read from the writeback circuit 150. The data forwarding network 258 allows consuming decoded instructions 108D to not have to get narrow produced values from the physical register file (PRF) 134. Also, the data entry 142(1)-142(X) in the physical register file (PRF) 134 assigned to a narrow produced value can be freed by the writeback circuit 150, because any further active consumers of the narrow produced value will obtain the narrow produced value from the register map table (RMT) 128 or by the data forwarding network 258, as discussed above. Note that the instruction processing system 100 in FIGS. 1 and 2 is different from other OoPs where a physical register is needed to hold narrow produced values that cannot be freed as long as the other consumers of the narrow produced value are active.

Figure 4:
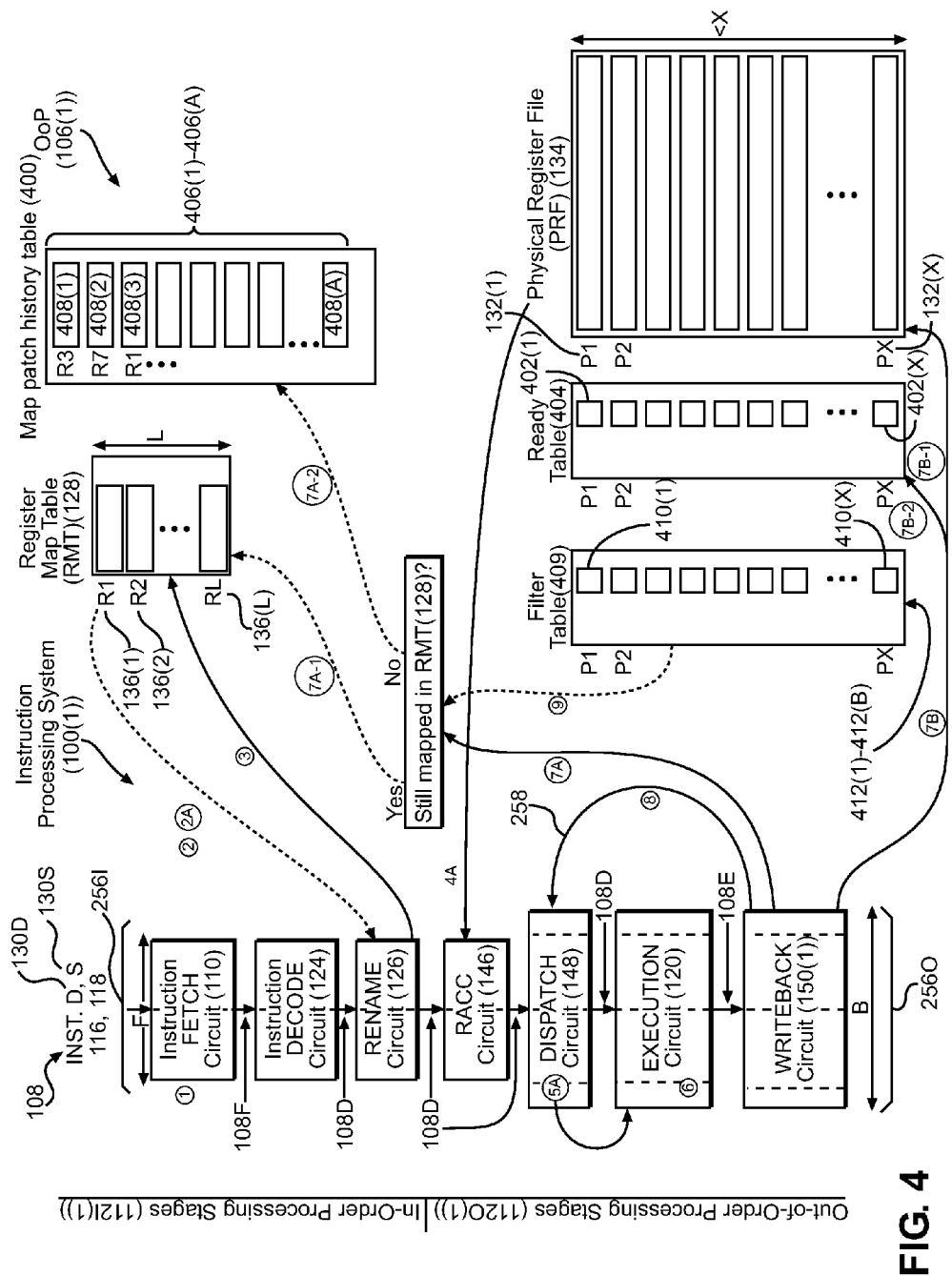
FIG. 4 is a block diagram of the instruction processing system of FIG. 2 that additionally includes a map patch history table used to store historical values of narrow written back values to the register map table (RMT), in case historical values need to be restored into the register map table (RMT), such as due to the occurrence of a precise interrupt.

FIG. 4 is a block diagram of an alternative instruction processing system 100(1) for an OoP 106(1) that is similar to the instruction processing system 100 in FIGS. 1 and 2. A number of in-order instruction processing lanes 256I in the in-order processing stages 112I(1) is 'F' to be able to process up to 'F' instructions 108 in parallel, similar to the OoP 106 example in FIG. 2. A number of out-of-order instruction processing lanes 256O in the out-order processing stages 112O(1) in this example is 'B' to be able to process up to 'B' instructions 108 in parallel, similar to the OoP 106 example in FIG. 2. The OoP 106(1) in FIG. 4 also includes similar stages and circuits to the OoP 106 in FIG. 2, which are shown with common element numbers between FIGS. 2 and 4, and thus will not be re-described. However, the OoP 106(1) in FIG. 4 additionally includes a map patch history table 400. As discussed below, the map patch history table 400 is used to store historical values of narrow written back values by an alternative writeback circuit 150(1) to the register map table (RMT) 128 in case historical values need to be restored into the register map table (RMT) 128, such as due to the occurrence of a precise interrupt.

With reference to FIG. 4, after a produced value is generated by the execution circuit 120, as previously discussed, the writeback circuit 150(1) is configured to determine if the produced value is a narrow value or a wide value. If the produced value is a wide value, as previously discussed, the writeback circuit 150(1) is configured to write the wide value to the physical register 132(1)-132(X) in the physical register file (PRF) 134 assigned to the destination register operand 130D for the executed instruction 108E (shown as number 7B-1 in FIG. 4). A ready entry 402(1)-402(X) in a ready table 404 corresponding to a physical register 132(1)-132(X) in the physical register file (PRF) 134 is updated to indicate that the produced value in the corresponding physical register 132(1)-132(X) in the physical register file (PRF) 134 is ready (shown in number 7B-2 in FIG. 4). The RACC circuit 146 is configured to access the ready table 404 as part of accessing the physical register file (PRF) 134 to retrieve a produced value for a source register operand 130S of a decoded instruction 108D to be executed.

With continuing reference to FIG. 4, if the writeback circuit 150(1) determines that the produced value generated by an executed instruction 108E is a narrow produced value, the writeback circuit 150(1) is configured to determine if a physical register 132(1)-132(X) in the physical register file (PRF) 134 is still mapped to the destination register operand 130D of the executed instruction 108E. If the physical register 132(1)-132(X) in the physical register file (PRF) 134 is still mapped to the destination register operand 130D of the executed instruction 108E, the narrow produced value is written to the mapping entry 136(1)-136(L) mapped to the logical register of the destination register operand 130D of the executed instruction 108E in the register map table (RMT) 128, as previously discussed. If however, the physical register 132(1)-132(X) in the physical register file (PRF) 134 is still not mapped to the destination register operand 130D of the executed instruction 108E, this means that the mapping of the destination register operand 130D in the register map table (RMT) 128 has changed since the produced executed instruction 108E was renamed. Thus, the narrow produced value should not be written back to the mapping entry 136(1)-136(L) previously assigned to the logical register of the destination register operand 130D of the executed instruction 108E, because the previously assigned mapping entry 136(1)-136(L) has been assigned to a logical register of the destination register operand 130D of another decoded instruction 108D that cannot be overwritten. However, if the execution circuit 120 subsequently executes a decoded instruction 108D that was based on a previous speculative state (e.g., a conditional branch) that was determined to have been predicted incorrectly, and thus a precise interrupt is generated, a way may be provided to restore the state of the narrow produced values previously stored in the register map table (RMT) 128 at the previous point in time in which the speculative state was predicted because of the flush and refetching of instructions 108 back to the speculative state instruction may be accomplished.

In this regard, the writeback circuit 150(1) in FIG. 4 is configured to store the narrow produced value to a mapping entry 406(1)-406(A) mapped to a logical register associated with the destination register operand 130D of the executed instruction 108E, in the map patch history table 400. The map patch history table 400 includes a plurality of mapping entries 406(1)-406(A) each configured to store at least one address pointer 408(1)-408(A) to an address of a physical register 132(1)-132(X) in the physical register file (PRF) 134. In this manner, the map patch history table 400 tracks older, uncommitted mappings of mapping entries 136(1)-136(L) to physical registers 132(1)-132(X) in the physical register file (PRF) 134. In this manner, if the OoP 106(1) needs to be recovered to a previous speculative state, such as in response to a precise interrupt, the narrow produced values stored in the map patch history table 400 can be used to reload the register map table (RMT) 128 to previous values from an earlier state.

With continuing reference to FIG. 4, in this example, to allow for the writeback circuit 150(1) to determine if a physical register 132(1)-132(X) in the physical register file (PRF) 134 is still mapped to the destination register operand 130D of the executed instruction 108E that generated a narrow produced value, a filter table 409 is employed. The filter table 409 in this example is a bit vector that contains a mapped indicator 410(1)-410(X) corresponding to each physical register 132(1)-132(X) in the physical register file (PRF) 134. If, for a corresponding particular physical register 132(1)-132(X), the mapped indicator 410(1)-410(X) in the filter table 409 indicates that the corresponding physical register 132(1)-132(X) for a destination register operand 130D for an executed instruction 108E that generated a narrow produced value is still mapped in the register map table (RMT) (128), the corresponding mapped indicator 410(1)-410(X) is set to mapped (e.g., a logical '0'). If, for a corresponding particular physical register 132(1)-132(X), the mapped indicator 410(1)-410(X) in the filter table 409 indicates that the corresponding physical register 132(1)-132(X) for a destination register operand 130D for an executed instruction 108E that generated a narrow produced value is still not mapped in the register map table (RMT) 128, the corresponding mapped indicator 410(1)-410(X) is set to not mapped (e.g., a logical '1'). Thus, the filter table 409 supports 'B' read ports 412(B) in this example to allow for a check of mapping status of up to 'B' productions per OoP 106(1) cycle. The filter table 409 is updated by the rename circuit 126 when a destination register operand 130D for a decoded instruction 108D is renamed in the physical register file (PRF) 134. At such a time, the mapped indicator 410(1)-401(X) in the filter table 409 corresponding to the previous physical register 132(1)-132(X) is set to not mapped, and the mapped indicator 410(1)-410(X) corresponding to the newly assigned physical register 132(1)-132(X) is set to mapped. Thus, the filter table 409 in this example has '2F' write ports 412(1)-412(B), where 'B' equals '2F'.

By providing for the writeback circuit 150(1) to be able to write narrow produced values into the register map table (RMT) 128, the number of write ports to the register map table (RMT) 128 may increase. The number of write ports to the register map table (RMT) 128 may increase by the number 'B' of out-of-order instruction processing lanes 256O in the writeback circuit 150(1) if it is desired to allow the writeback circuit 150(1) to write back produced values from executed instructions 108E in each of the 'B' out-of-order instruction processing lanes 256O in one OoP 106(1) cycle in the instances that all produced values to be written back by the writeback circuit 150(1) in a given OoP 106(1) cycle are narrow produced values. In this regard, the map patch history table 400 in the OoP 106(1) in FIG. 4 would also ideally have 'B' write ports in case none of the produced values to be written back by the writeback circuit 150(1) in a given OoP 106(1) cycle are still mapped to a physical register 132(1)-132(X) in the physical register file (PRF) 134. However, it may be desired to reduce the number of write ports on the register map table (RMT) 128 and/or the map patch history table 400.

Figure 5:
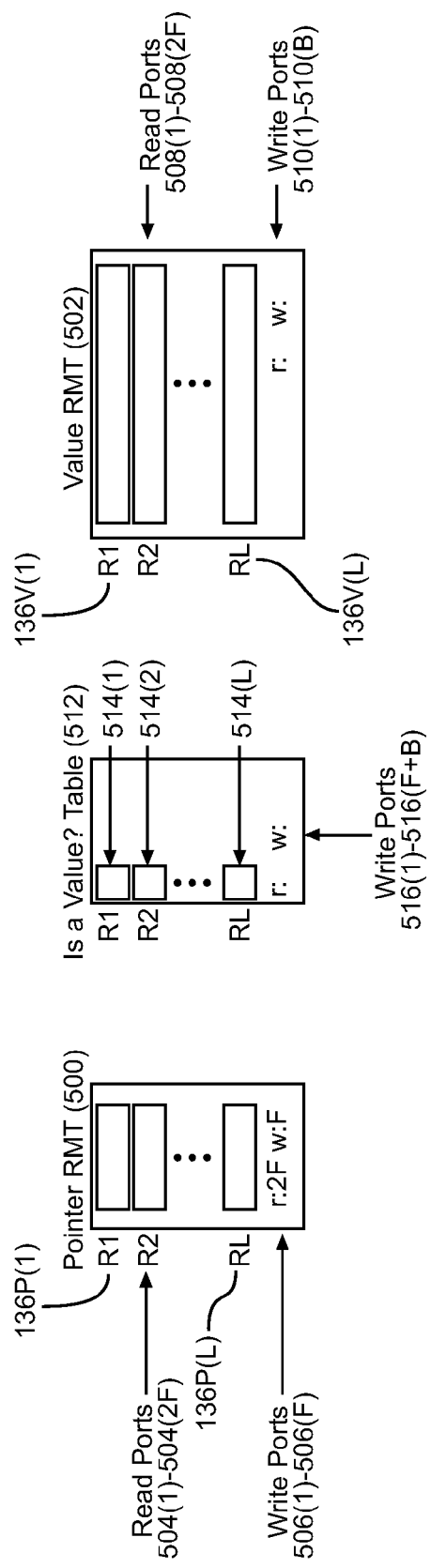
FIG. 5 is a block diagram of another exemplary register map table (RMT), provided across a pointer register map table (RMT), a value indicator table, and a value register map table (RMT), to provide a register map table (RMT) that allows a write back of the entire width of the write back stage, such as when all write back values are narrow values, with reduced port pressure.

In this regard, FIG. 5 illustrates additional data structures that may be employed in the OoP 106(1) in FIG. 4 to reduce write port pressure on the register map table (RMT) 128 and/or the map patch history table 400. In this regard, 'F'+'B' write ports provided in the register map table (RMT) 128 are distributed across two tables: a pointer register map table (RMT) 500 and a value register map table (RMT) 502. The pointer register map table (RMT) 500 operates similarly to the register map table (RMT) 128 in FIG. 4. The pointer register map table (RMT) 500 has a same number of pointer entries 136P(1)-136P(L) as mapping entries in the register map table (RMT) 128 in FIGS. 2 and 4. However, the pointer register map table (RMT) 500 has '2F' read ports 504(1)-504(2F) and 'F' write ports 506(1)-506(F) in this example. The value register map table (RMT) 502 also has the same number of value entries 136V(1)-136V(L) as mapping entries in the register map table (RMT) 128 in FIG. 4. However, the value register map table (RMT) 502 only contains values and has '2F' read ports 508(1)-508(2F), but only 'B' write ports 510(1)-510(B) in this example. A third table called a "Is a Value?" table 512 contains an entry 514(1)-514(L) per mapping entry to indicate whether the value register map table (RMT) 502 or the pointer register map table (RMT) 500 contains valid data. Only one of the two tables between the value register map table (RMT) 502 and the pointer register map table (RMT) 500 contains valid data. The "Is a Value?" table 512 still requires 'F'+'B' write ports 516(1)-516(F+B), but having much smaller entry sizes (i.e., 1 bit per entry 514(1)-514(L) in this example), providing 'F'+'B' write ports 516(1)-516(F+B) may not be difficult to achieve.

In this regard, with continuing reference to FIG. 5, the writeback circuit 150(1) in the instruction processing system 100(1) in FIG. 4 can be configured to write information 140(1)-140(L) as address pointers for wide produced values in the pointer register map table (RMT) 500, and as narrow produced values in the value register map table (RMT) 502. The writeback circuit 150(1) will update a corresponding entry 514(1)-514(L) in the "Is A Value" register map table (RMT) 512 to indicate if the corresponding pointer entry 136P(1)-136P(L) in the pointer register map table (RMT) 500 or the corresponding value entry 136V(1)-13V(L) in the value register map table (RMT) 502 is valid. Thus, the rename circuit 126 in the instruction processing system 100(1) in FIG. 4 can consult a corresponding entry 514(1)-514(L) to the mapping entry mapped to the logical register of the source register operand 130S of a decoded instruction 108D in the "Is A Value" register map table (RMT) 512 to determine whether the pointer register map table (RMT) 500 or the value register map table (RMT) 502 contains a valid entry for the mapping entry mapped to the logical register of the source register operand 130S of a decoded instruction 108D. The rename circuit 126 can also use the information in the "Is A Value" register map table (RMT) 512 to indicate if the source value is a narrow or wide value.

Note that size of the pointer register map table (RMT) 500 need not match the size of the value register map table (RMT) 502. For example, the pointer register map table (RMT) 500 uses seven (7) bits per pointer entry 136P(1)-136P(L) assuming 128 physical registers 132(1)-132(X) in the physical register file (PRF) 134 need to be pointed to, while the value register map table (RMT) 502 may have twenty-four (24) bits per value entry 136V(1)-136V(L), assuming 24 bits (i.e., 3 bytes) suffice to provide the desired coverage across all values generated by the out-of-order instruction processing lanes 256O.

Storing narrow produced values for instruction operands directly in a register map in an OoP for reduced physical register file port pressure and/or increased performance according to aspects disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
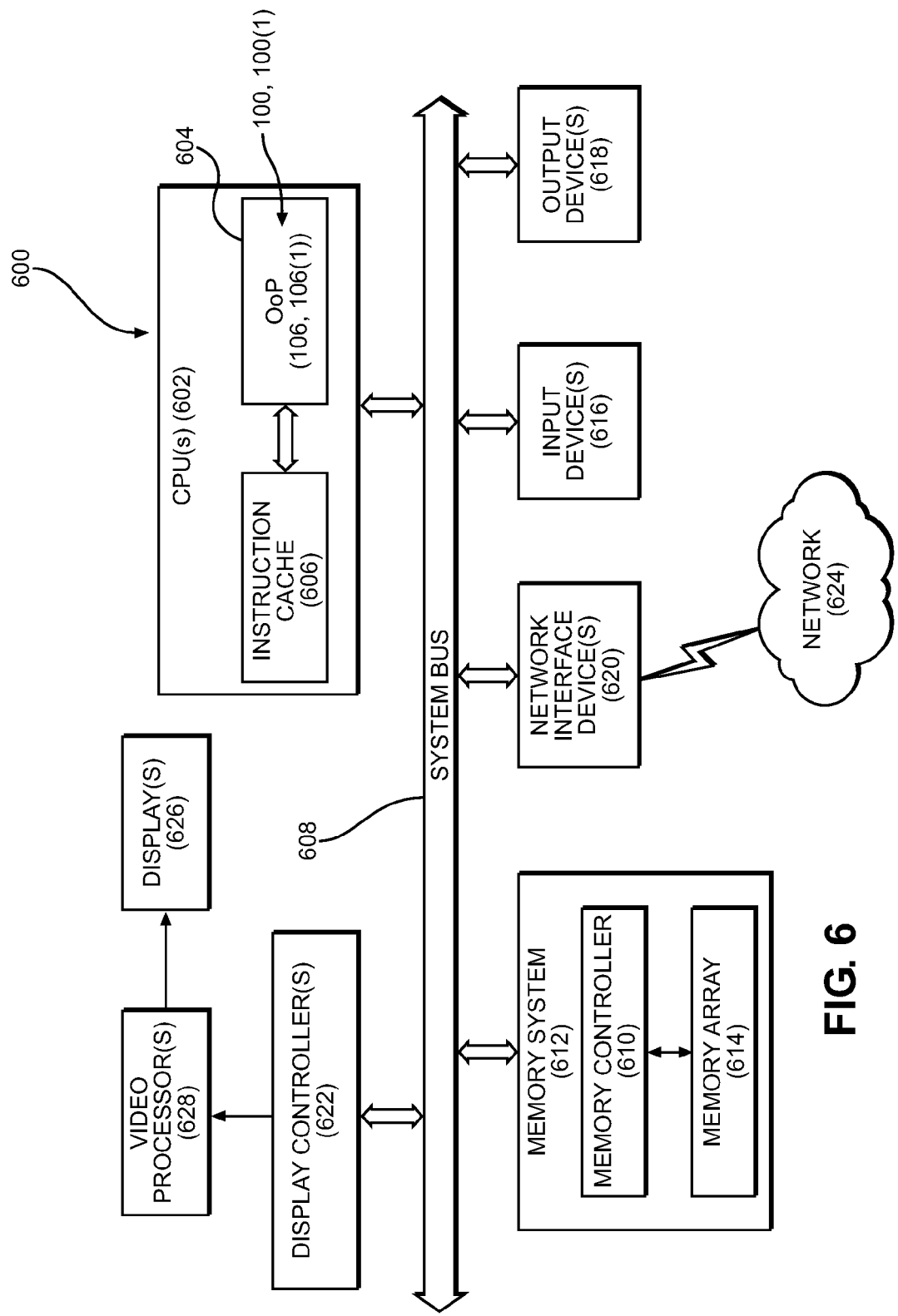
FIG. 6 is a block diagram of an exemplary processor-based system that includes a CPU that includes an instruction processing system configured to write back narrow values produced by execution instructions directly into a register map table (RMT).

In this regard, FIG. 6 illustrates an example of a processor-based system 600 that includes an instruction processing system configured to write back narrow values produced by execution instructions directly into a register map table (RMT), and according to any of the particular aspects discussed above. In this example, the processor-based system 600 includes a central processing unit (CPU) 602 that includes an OoP 604, also known as a processing unit. The OoP 604 can be the OoP 106 or 106(1) described above. The instruction processing systems 100, 100(1) in FIGS. 1, 2, and 4 could be included in the CPU 602 or the OoP 604. The CPU 602 may have an instruction cache 606, like the instruction cache 118 in FIG. 1 for example, coupled to the processors 604 for rapid access to temporarily stored data. The CPU 602 is coupled to a system bus 608 and can intercouple peripheral devices included in the processor-based system 600. As is well known, the CPU 602 communicates with these other devices by exchanging address, control, and data information over the system bus 608. For example, the CPU 602 can communicate bus transaction requests to a memory controller 610 in a memory system 612 as an example of a slave device. Although not illustrated in FIG. 6, multiple system buses 608 could be provided, wherein each system bus 608 constitutes a different fabric. In this example, the memory controller 610 is configured to provide memory access requests to a memory array 614 in the memory system 612.

Other devices can be connected to the system bus 608. As illustrated in FIG. 6, these devices can include the memory system 612, one or more input devices 616, one or more output devices 618, one or more network interface devices 620, and one or more display controllers 622, as examples. The input device(s) 616 can include any type of input device, including but not limited to input keys, switches, voice processors, etc. The output device(s) 618 can include any type of output device, including but not limited to audio, video, other visual indicators, etc. The network interface device(s) 620 can be any devices configured to allow exchange of data to and from a network 624. The network 624 can be any type of network, including but not limited to a wired or wireless network, a private or public network, a local area network (LAN), a wireless local area network (WLAN), a wide area network (WAN), a BLUETOOTH™ network, and the Internet. The network interface device(s) 620 can be configured to support any type of communications protocol desired.

The CPU 602 may also be configured to access the display controller(s) 622 over the system bus 608 to control information sent to one or more displays 626. The display controller(s) 622 sends information to the display(s) 626 to be displayed via one or more video processors 628, which process the information to be displayed into a format suitable for the display(s) 626. The display(s) 626 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An instruction processing system for a processor, comprising:
    an in-order processing stage configured to fetch an instruction from an instruction memory; and
    an out-of-order processing stage, comprising:
        an execution circuit configured to execute the instruction; and
        a writeback circuit configured to:
            determine if a produced value generated for the executed instruction in the execution circuit is a narrow produced value; and
            responsive to the produced value for the executed instruction being a narrow produced value, write back the narrow produced value as information to a mapping entry mapped to a logical register of a destination register operand of the executed instruction, of a register map table (RMT) comprising a plurality of mapping entries each configured to store at least one address pointer pointing to an address of a physical register in a physical register file (PRF);
    wherein:
        the in-order processing stage further comprises:
            a register access (RACC) circuit configured to:
                access a physical register in the physical register file (PRF) comprising a plurality of physical registers, based on a logical register of a source register operand of the instruction to retrieve a produced value from the executed instruction in the execution circuit; and
                provide the retrieved produced value as the source register operand of the instruction; and
        the out-of-order processing stage further comprises:
            a dispatch circuit configured to:
                dispatch the instruction from the RACC circuit to the execution circuit to be executed when all source register operands for the instruction are available.

2. The instruction processing system of claim 1, wherein the writeback circuit is further configured to, responsive to the produced value for the executed instruction being a wide produced value, write back the wide produced value to a physical register assigned to the destination register operand of the executed instruction in the physical register file (PRF).

3. The instruction processing system of claim 1, wherein, responsive to the produced value for the executed instruction being the narrow produced value, the writeback circuit is further configured to free an assigned physical register in the physical register file (PRF) to the destination register operand of the executed instruction.

4. The instruction processing system of claim 1, wherein the writeback circuit is further configured to determine from the register map table (RMT) if the destination register operand for the executed instruction is mapped to the physical register in the physical register file (PRF);
    responsive to the destination register operand for the executed instruction being mapped to the mapping entry in the register map table (RMT), write back the narrow produced value to the mapping entry mapped to the destination register operand of the executed instruction, in the register map table (RMT).

5. The instruction processing system of claim 4, wherein the writeback circuit is configured to determine from the register map table (RMT) if the destination register operand for the executed instruction is mapped to the physical register in the physical register file (PRF) by being configured to:
    access a filter table comprising a plurality of mapped indicators each corresponding to a physical register in the physical register file (PRF) indicating if the physical register is mapped; a
    responsive to a mapped indicator of the plurality of mapped indicators in the filter table indicating the physical register is mapped to the destination register operand of the executed instruction, write back the narrow produced value to the mapping entry mapped to the destination register operand of the executed instruction, in the register map table (RMT).

6. The instruction processing system of claim 5, wherein:
    the in-order processing stage further comprises a rename circuit configured to:
        receive the instruction;
        access the register map table (RMT) to map the mapping entry based on the logical register of the destination register operand of the instruction to the physical register in the physical register file (PRF); and
        clear the mapped indicator in the filter table corresponding to the physical register mapped to the destination register operand of the instruction.

7. The instruction processing system of claim 5, wherein the writeback circuit is further configured to, responsive to the mapped indicator in the filter table indicating that the physical register is not mapped to the destination register operand of the executed instruction, write back the narrow produced value to the mapping entry mapped to the destination register operand of the executed instruction, in a register map patch history table comprising a plurality of mapping entries each configured to store at least one address pointer to an address of a physical register in the physical register file (PRF).

8. The instruction processing system of claim 7, configured to recover the register map table (RMT) to a previous speculative state in response to a precise interrupt generated in the processor.

9. The instruction processing system of claim 1, wherein the writeback circuit is further configured to forward the produced value for the executed instruction via a data forwarding network to the dispatch circuit to be used as a source value for the source register operand of the instruction identified as not ready.

10. The instruction processing system of claim 9, wherein the RACC circuit is further configured to:
   access a ready table to determine if the produced value for the source register operand of the instruction is ready to be consumed; and
   responsive to determining that the produced value for the source register operand of the instruction is not ready to be consumed, dispatching the instruction to the dispatch circuit without the produced value for the source register operand of the instruction.

11. The instruction processing system of claim 1, wherein the writeback circuit is configured to determine if the produced value generated for the executed instruction in the execution circuit is the narrow produced value by being configured to determine a number of significant bits in the produced value.

12. The instruction processing system of claim 1 comprising the physical register file (PRF).

13. The instruction processing system of claim 12, wherein the out-of-order processing stage comprises a plurality of out-of-order instruction processing lanes, the out-of-order processing stage configured to process instructions in the plurality of out-of-order instruction processing lanes.

14. The instruction processing system of claim 13, further comprising the register map table (RMT) comprising the plurality of mapping entries each configured to store a number of the at least one address pointer less than a number of the plurality of out-of-order instruction processing lanes, pointing to an address of a physical register in the physical register file (PRF).

15. The instruction processing system of claim 14, wherein the register map table (RMT) contains fewer write ports than the number of the plurality of out-of-order instruction processing lanes.

16. The instruction processing system of claim 14, wherein a bit width of the narrow produced value is equal to a bit width of the at least one address pointer.

17. The instruction processing system of claim 13, wherein the in-order processing stage is configured to process the instructions in a plurality of in-order instruction processing lanes per clock cycle of the processor.

18. The instruction processing system of claim 1, wherein:
   the in-order processing stage further comprises a rename circuit configured to:
      receive the instruction;
      read the register map table (RMT) at a mapping entry mapped to a logical register of the source register operand of the instruction to receive information stored in a physical register in the physical register file (PRF) based on the source register operand of the instruction;
      determine if the received information from the register map table (RMT) is a narrow produced value or an address pointer mapped to a physical register in the physical register file (PRF) storing a wide produced value; and
      responsive to the received information from the register map table (RMT) being the narrow produced value, provide the received information as the produced value for the source register operand of the instruction.

19. The instruction processing system of claim 15, wherein:

the in-order processing stage further comprises:
   a register access (RACC) circuit configured to:
      access a physical register in the physical register file (PRF) comprising a plurality of physical registers, based on a mapping entry mapped to a logical register of a source register operand of the instruction to retrieve a produced value from the executed instruction in the execution circuit; and
      provide the retrieved produced value as the source register operand of the instruction; and
   the RACC circuit is further configured to, responsive to the rename circuit receiving the address pointer from the register map table (RMT) being the wide produced value:
      access the physical register at the address pointer in the physical register file (PRF) to retrieve the wide produced value stored in the physical register; and
      provide the received wide produced value for the source register operand of the instruction.

20. The instruction processing system of claim 19, wherein, responsive to the rename circuit receiving the address pointer from the register map table (RMT) being the narrow produced value for a group of instructions, the rename circuit is further configured to bypass the RACC circuit to provide the group of instructions to a dispatch circuit.

21. The instruction processing system of claim 18, wherein the rename circuit is configured to read the register map table (RMT) at the mapping entry mapped to the logical register of the source register operand of the instruction to receive the information in the physical register in the physical register file (PRF) based on the source register operand of the instruction, by being configured to:
   read a value register map table (RMT) at the mapping entry mapped to the logical register of the source register operand of the instruction to determine if a pointer register map table (RMT) or the value register map table (RMT) contains a valid data entry for the mapping entry mapped to the logical register of the source register operand of the instruction;
   responsive to determining that the pointer register map table (RMT) contains a valid data entry for the mapping entry mapped to the logical register of the source register operand of the instruction, provide the received information at the mapping entry in the pointer register map table (RMT) as the narrow produced value for the source register operand of the instruction; and
   responsive to determining that the value register map table (RMT) contains a valid data entry for the mapping entry mapped to the logical register of the source register operand of the instruction, access the physical register in the physical register file (PRF) at the address pointer of the information stored in the mapping entry in the value register map table (RMT) to retrieve a wide produced value stored in the physical register.

22. The instruction processing system of claim 1 integrated into a system-on-a-chip (SoC).

23. The instruction processing system of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

24. An instruction processing system for a processor, comprising:
  a means for fetching an instruction from an instruction memory;
  a means for executing the instruction;
  a means for determining if a produced value generated for the executed instruction is a narrow produced value;
  responsive to the produced value for the executed instruction being a narrow produced value, a means for writing back the narrow produced value as information to a mapping entry mapped to a logical register of a destination register operand of the executed instruction, of a register map table (RMT) comprising a plurality of mapping entries each configured to store at least one address pointer pointing to an address of a physical register in a physical register file (PRF);
  a means for accessing a physical register in the physical register file (PRF) comprising a plurality of physical registers, based on a mapping entry mapped to a logical register of a source register operand of the instruction to retrieve a produced value from the executed instruction in an execution circuit in an out-of-order processing stage;
  a means for providing the retrieved produced value as the source register operand of the instruction; and
  a means for dispatching the instruction from an in-order processing stage to the execution circuit in the out-of-order processing stage to be executed when all source register operands for the instruction are available.

25. A method of processing an instruction in a processor, comprising:
  fetching an instruction in an in-order processing stage from an instruction memory;
  executing the instruction in an out-of-order processing stage;
  determining if a produced value generated for the executed instruction is a narrow produced value; and
  responsive to the produced value for the executed instruction being a narrow produced value, writing back the narrow produced value from the out-of-order processing stage as information to a mapping entry mapped to a logical register of a destination register operand of the executed instruction, of a register map table (RMT) comprising a plurality of mapping entries each configured to store at least one address pointer pointing to an address of a physical register in a physical register file (PRF);
  accessing, in the in-order processing stage, a physical register in the physical register file (PRF) comprising a plurality of physical registers, based on a mapping entry mapped to a logical register of a source register operand of the instruction to retrieve a produced value from the executed instruction in an execution circuit in the out-of-order processing stage;
  providing, in the in-order processing stage, the retrieved produced value as the source register operand of the instruction; and
  dispatching the instruction from the in-order processing stage to the execution circuit in the out-of-order processing stage to be executed when all source register operands for the instruction are available.

26. The method of claim 25, further comprising, responsive to the produced value for the executed instruction being a wide produced value, writing back the wide produced value to the physical register assigned to the destination register operand of the executed instruction in the physical register file (PRF).

27. The method of claim 25, further configured to, responsive to the produced value for the executed instruction being the narrow produced value, freeing an assigned physical register in the physical register file (PRF) to the destination register operand of the executed instruction.

28. The method of claim 25, further comprising:
  determining, from the register map table (RMT), if the destination register operand for the executed instruction is mapped to the physical register in the physical register file (PRF); and
  responsive to the destination register operand for the executed instruction being mapped to the mapping entry in the register map table (RMT), writing back the narrow produced value to the mapping entry mapped to the logical register of the destination register operand of the executed instruction, in the register map table (RMT).

29. The method of claim 25, further comprising forwarding the produced value for the executed instruction via a forwarding path to be used as a source value for the source register operand of the instruction identified as not ready.

30. The method of claim 25, further comprising:
  reading the register map table (RMT) at a mapping entry mapped to a logical register of a source register operand of the instruction in the in-order processing stage to receive information based on the source register operand of the instruction;
  determining if the received information from the register map table (RMT) is a narrow produced value or an address pointer mapped to a physical register in the physical register file (PRF) storing a wide produced value; and
  providing the received information as the produced value for the source register operand of the instruction if the received address pointer from the register map table (RMT) is a narrow produced value.

* * * * *